(12) United States Patent
Yonezawa et al.

(10) Patent No.: US 8,239,105 B2
(45) Date of Patent: Aug. 7, 2012

(54) CONTROL DEVICE AND CONTROL METHOD OF AUTOMATIC TRANSMISSION

(75) Inventors: Shiro Yonezawa, Chiyoda-ku (JP);
Takeru Okabe, Chiyoda-ku (JP);
Nozomu Kamioka, Chiyoda-ku (JP);
Tomohisa Shoda, Chiyoda-ku (JP);
Masaki Horii, Chiyoda-ku (JP);
Yasufumi Ogawa, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 965 days.

(21) Appl. No.: 12/133,993

(22) Filed: Jun. 5, 2008

(65) Prior Publication Data

US 2009/0137362 A1    May 28, 2009

(30) Foreign Application Priority Data

Nov. 22, 2007    (JP) ................................ 2007-303267

(51) Int. Cl.
*G06F 19/00* (2011.01)
*G05D 1/00* (2006.01)

(52) U.S. Cl. ................. 701/51; 701/1; 701/60
(58) Field of Classification Search .................. None
See application file for complete search history.

(56) References Cited

U.S. PATENT DOCUMENTS

| | | | | |
|---|---|---|---|---|
| 4,468,988 A * | 9/1984 | Hiramatsu | ...................... | 477/65 |
| 4,509,625 A * | 4/1985 | Tellert | .............................. | 477/86 |
| 5,343,970 A * | 9/1994 | Severinsky | ................ | 180/65.25 |
| 5,408,411 A * | 4/1995 | Nakamura et al. | .............. | 701/48 |
| 5,481,460 A * | 1/1996 | Masaki et al. | .................. | 701/50 |
| 5,678,671 A * | 10/1997 | Leimbach et al. | ......... | 192/70.22 |
| 5,841,201 A * | 11/1998 | Tabata et al. | ................. | 290/40 C |
| 5,847,272 A * | 12/1998 | Schneider et al. | ......... | 73/115.02 |
| 5,856,709 A * | 1/1999 | Ibaraki et al. | .................... | 290/45 |
| 6,148,784 A * | 11/2000 | Masberg et al. | ........... | 123/192.1 |
| 6,278,915 B1 * | 8/2001 | Deguchi et al. | .................. | 701/22 |
| 7,013,746 B2 * | 3/2006 | Matsumura et al. | ............ | 74/335 |
| 7,121,976 B2 * | 10/2006 | Sakamoto et al. | ............. | 477/98 |
| 2002/0134637 A1* | 9/2002 | Salecker et al. | ............. | 192/54.1 |
| 2003/0045393 A1* | 3/2003 | Yoshioka et al. | ............... | 477/36 |
| 2005/0023102 A1* | 2/2005 | Brissenden et al. | ........ | 192/85 R |
| 2005/0126321 A1* | 6/2005 | Ochi et al. | ...................... | 74/335 |
| 2005/0140322 A1* | 6/2005 | Itakura | .......................... | 318/466 |
| 2005/0233858 A1* | 10/2005 | Smith et al. | .................... | 477/175 |

FOREIGN PATENT DOCUMENTS

| | | |
|---|---|---|
| DE | 10037972 A1 | 3/2001 |
| DE | 10233380 A1 | 6/2003 |
| JP | 2002-081472 A | 3/2002 |
| JP | 2003219678 A | 7/2003 |
| JP | 2006-006037 A | 1/2006 |

* cited by examiner

*Primary Examiner* — Ian Jen
(74) *Attorney, Agent, or Firm* — Sughrue Mion, PLLC (57) ABSTRACT

A control device of an automatic transmission includes a motor control portion to control an output of a motor that executes a control operation on a clutch control portion. The motor control portion includes a target motor current computation portion that computes a target motor current according to a desired driving state, a motor current detection portion that detects plural motor currents respectively corresponding to plural detection timings, a selection portion that selects a motor current corresponding to the desired driving state among the detected plural motor currents, and a motor driving portion that applies feedback control on an output of the motor according to a difference between the target motor current and the selected motor current. Hence, not only can the most suitable clutch control be applied for each gear-change interval at gear change, but also the comfortable feeling during the driving and the fuel efficiency can be enhanced.

5 Claims, 10 Drawing Sheets

CONTROL DEVICE AND CONTROL METHOD OF AUTOMATIC TRANSMISSION

BACKGROUND OF THE INVENTION

1. Field of the Invention

The present invention relates to a control device and a control method of an automatic transmission that is mounted in an automobile to control gear change using a motor.

2. Background Art

In the related art, there is an automatic transmission with start clutch as is disclosed, for example, in JP-A-2002-81472. In this related art, an actuator is provided to the start clutch of the dry single plate type, and the clutch engaging force is adjusted by varying a stroke of the clutch using the actuator. In order to ensure safety and comfortable feeling, the start clutch has to control the clutch engaging force with accuracy.

Also, JP-A-2006-6037 discloses a conventional motor control technique. This technique in the related art relates to a method for suppressing influences of a current ripple when detecting a current flowing in the motor. The motor current is detected at specific timing in response to the motor rotation angle.

As has been described, in a driving state where a vehicle is creeping at a low speed or starts slowly, the engaging force of the start clutch has to be adjusted delicately. When the gear is to be shifted in the automatic transmission with clutch, it is necessary to disengage the clutch first and then to engage the clutch after the gear is shifted while preventing the occurrence of a gear change shock. Hence, in the case of a mechanism that uses the motor as an actuator to control a stroke of the clutch and the rotation angle of the motor is proportional to the stroke of the clutch, a torque amount of the motor has to be adjusted with high accuracy in order to adjust the engaging force of the clutch. Because the motor torque is proportional to a current amount of the motor, the control accuracy of the motor current has to be enhanced in order to enhance the control accuracy of the motor torque. Applying such accuracy enhancement to the transmission control using the motor in the related art, however, raises problems as follows.

Such problems will be described in accordance with an operation to engage the clutch from a state where the clutch is completely disengaged. The clutch mechanism described herein is a mechanism in which the rotation angle of the motor is proportional to a stroke of the clutch, and is therefore capable of adjusting an engagement amount using a torque of the motor. In addition, it has a mechanism by which the clutch returns to an open side in a case where no motive power is provided to the clutch from the motor. The clutch is therefore in an open state in such a case, and when the clutch is to be engaged, it is necessary to provide motive power constantly to the clutch from the motor.

Initially, in a state where the clutch is completely disengaged, the motor is not driven and no current is flowing in the motor.

Subsequently, a clutch stroke is varied to engage the clutch. Because the clutch is in a fully open state, a specific driving pattern is provided to the motor driving circuit to rotate the motor. After the specific driving pattern is provided to the motor driving circuit, the motor starts to rotate with some delay time. It is also necessary to manage the motor torque in this interval until the motor starts to rotate. However, in the motor control technique in the related art, a current is detected in sync with the rotation of the motor. It is therefore impossible to detect a current in a state where the motor is stopped or a state where the motor is rotating at an extremely low rotation speed that falls out of the detectable range of the control device. Accordingly, because the motor torque cannot be managed, it is impossible to control the motor toque with high accuracy.

Subsequently, the motor starts to rotate and a clutch stroke starts to vary. At this point in time, because the motor is rotating, it is possible to control the motor torque with high accuracy on the basis of the current detected in response to the rotation angle of the motor.

The clutch stroke varies more rapidly with a further increase of the motor rotation speed. At this point in time, in a case where a current is detected in response to the motor rotation angle in the same manner as above, the number of current detection times and the number of current computation times per unit time by the microcomputer are increased. This raises a problem that larger load is applied on the microcomputer.

When the clutch is to be engaged thereafter, the rotation speed of the motor is reduced gradually by lessening a variance of the clutch stroke gradually to prevent the occurrence of a shock. Once the rotation speed of the motor is reduced, load applied on the microcomputer does not become excessively large when a current is detected in response to the motor rotation angle, and no particular problem arises.

After the clutch is engaged, the clutch stroke no-longer varies, and the clutch engaging force has to be adjusted according to a driving state. Nevertheless, because the motor is not rotating while the clutch is engaged, it is impossible to detect a motor current in response to the rotation angle of the motor. Hence, as was the case described above, the incapability of controlling the motor torque makes it impossible to adjust the clutch engaging force.

SUMMARY OF THE INVENTION

The invention was devised to solve the problems discussed above, and has an object to provide a control device and a control method of an automatic transmission that controls gear change using a motor in such a manner that not only can the clutch be controlled most suitably in each gear-change interval at gear change, but also the comfortable feeling during the driving and the fuel efficiency can be enhanced.

One aspect of the invention is a control device of an automatic transmission, including an automatic transmission coupled to an engine and having a gear-change mechanism portion and a clutch to transmit motive power from the engine to the gear-change mechanism portion, a clutch control portion to engage and disengage the clutch, and a motor control portion to control an output of a motor that executes a control operation on the clutch control portion. The motor control portion includes a target motor current computation portion that computes a target motor current according to a desired driving state, a motor current detection portion that detects plural motor currents respectively corresponding to plural detection timings, a selection portion that selects a motor current corresponding to the desired driving state among the plural motor currents that have been detected, and a motor driving portion that applies feedback control on the output of the motor according to a difference between the target motor current and the motor current that has been selected.

Another aspect of the invention is a control method of an automatic transmission. The automatic transmission is composed of an automatic transmission coupled to an engine and having a gear-change mechanism portion and a clutch to transmit motive power from the engine to the gear-change mechanism portion, a clutch control portion to engage and disengage the clutch, and a motor control portion to control an output of a motor that executes a control operation on the clutch control portion. The control method includes, as operations by the motor control portion, computing a target motor current for a desired driving state, detecting plural motor currents respectively corresponding to plural detection timings, selecting a motor current corresponding to the desired driving state among the plural motor currents that have been detected, and applying feedback control on the output of the motor according to a difference between the target motor current and the motor current that has been selected.

According to the control device and the control method of an automatic transmission of the invention, it is possible to control the clutch of the automatic transmission with accuracy by controlling a motor torque most suitably according to a driving state by switching current detection methods for the motor that controls the clutch according to the driving state. It is thus possible to achieve automatic transmission control with comfortable feeling.

The foregoing and other objects, features, aspects, and advantages of the present invention will become more apparent from the following detailed description of the present invention when taken in conjunction with the accompanying drawings.

DESCRIPTION OF THE PREFERRED EMBODIMENT

Figure 1:
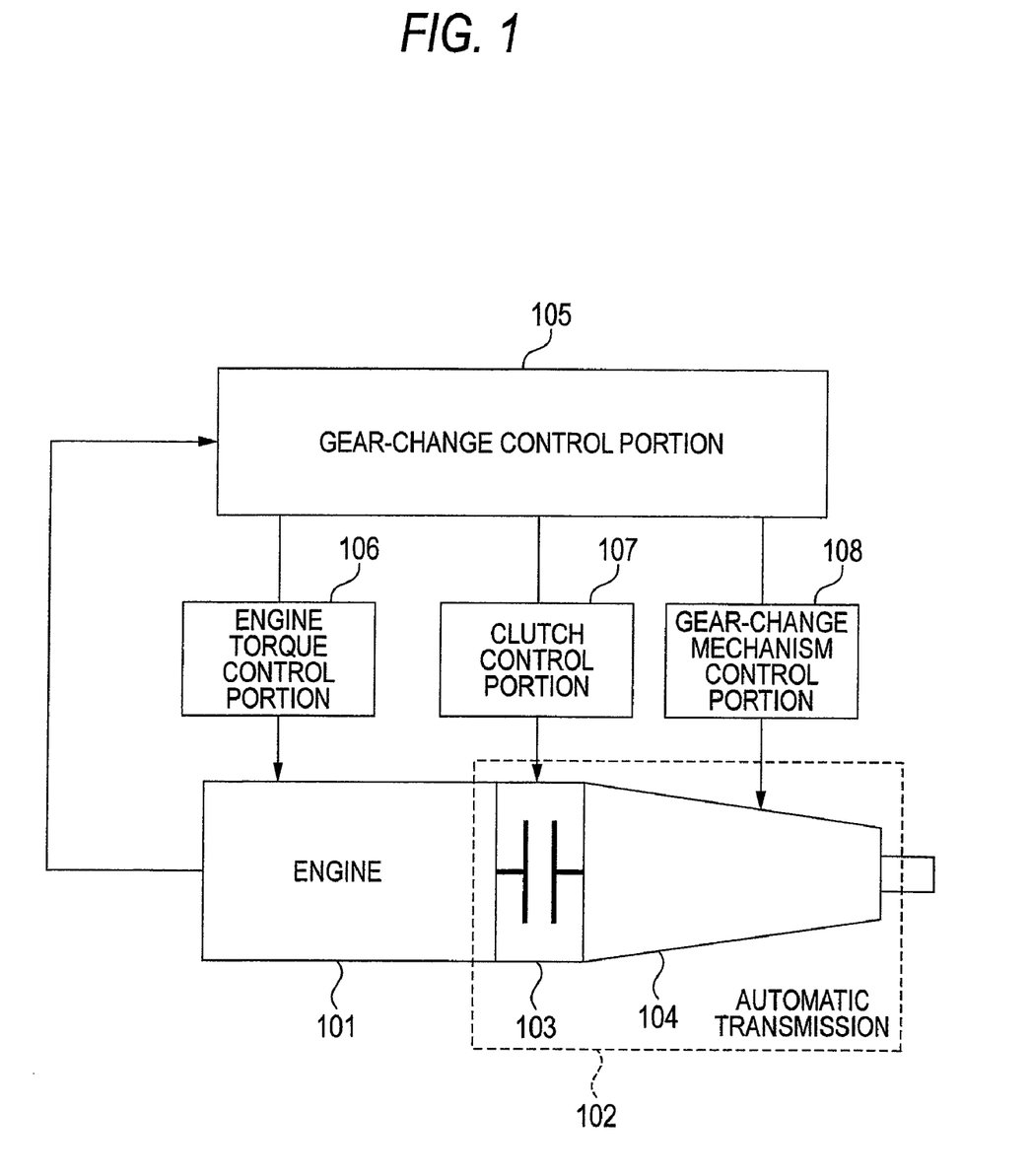
FIG. 1 a view schematically showing the system configuration of a transmission control device according to one embodiment of the invention.

FIG. 1 is a view schematically showing the system configuration of a control device of an automatic transmission according to one embodiment of the invention.

Referring to FIG. 1, numeral 101 denotes an engine, numeral 102 denotes an automatic transmission coupled to the engine 101, numeral 103 denotes a clutch attached to an input portion of the automatic transmission 102 to transmit motive power from the engine 101, numeral 104 denotes a gear-change mechanism to control gearshift of the automatic transmission 102, numeral 105 denotes a gear-change control portion to control the gearshift of the automatic transmission 102 by changing the engagement of the clutch 103 to the automatic transmission 102 and the configuration of the gear-change mechanism 104, numeral 106 denotes an engine torque control portion to control an engine torque amount at gear change according to a command from the gear-change control portion 105, numeral 107 denotes a clutch control portion to control the clutch 103 and the clutch engaging force at gear change according to a command from the gear-change control portion 105, numeral 108 denotes a gear-change mechanism control portion to control gearshift of the gear-change mechanism 104 according to a command from the gear-change control portion 105.

Figure 2:
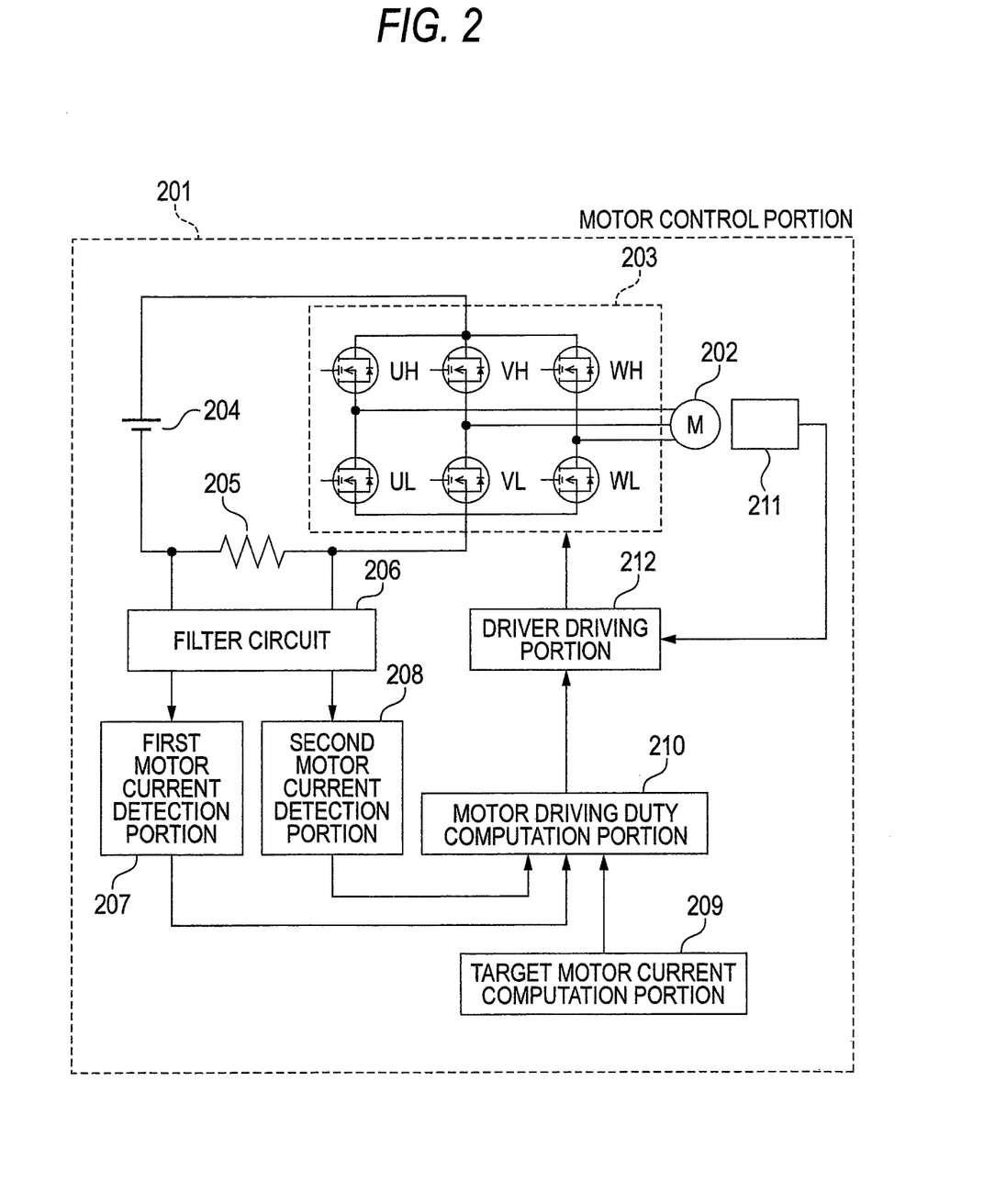
FIG. 2 is a block diagram showing the system configuration of a motor control portion according to the embodiment of the invention.

FIG. 2 is a view showing a motor control portion included in each of the clutch control portion 107 and the gear-change mechanism control portion 108. The clutch control portion 107 has a mechanism in which the rotation angle of the motor is proportional to a stroke of the clutch, and it is possible to adjust an engaging amount using a torque of the motor. The gear-change mechanism control portion 108 has a mechanism in which the rotation angle of the motor is proportional to a travel amount of the gear-change mechanism 104, and it is possible to adjust a travel speed with respect to the load during travel using a torque of the motor.

Referring to FIG. 2, numeral 201 denotes a motor control portion, and numeral 202 denotes a motor that drives the clutch 103 or the gear-change mechanism 104. As an example of the motor 202, a 3-phase brushless motor is shown herein. Numeral 203 denotes a motor driving circuit composed of six FETs (Field Effect Transistors) respectively indicated as UH, UL, VH, VL, WH, and WL. Numeral 204 denotes a power supply of the motor driving circuit 203. Numeral 205 denotes a shunt resistor to detect a current flowing in the motor 202, Numeral 206 denotes a filter circuit to smooth a voltage across the shunt resistor 205, Numeral 207 denotes a first motor current detection portion to detect a current flowing into the motor 202 on the basis of the voltage across the shunt resistor 205, Numeral 208 denotes a second motor current detection portion to detect a current flowing into the motor 202 on the basis of the voltage across the shunt resistor 205, Numeral 209 denotes a target motor current computation portion to compute a target motor current according to a gear change state and a driving state of a vehicle, and Numeral 210 denotes a motor driving duty computation portion to compute a driving duty, which is to be provided to the motor driving circuit 203, on the basis of an actual current detected in the motor current detection portion 207 or 208 and the target motor current computed in the target motor current computation portion 209. Because a torque of the motor 202 is proportional to a motor current amount, a motor torque amount to be set as the target is adjusted by applying feedback control on the motor current amount. Numeral 211 denotes a motor rotation position detection sensor to detect the rotation position of the motor 202. Numeral 212 is a driver driving portion to select an FET to be driven according to the motor rotation position detected in the motor rotation position detection sensor 211 and to drive the motor driving circuit 203 according to the driving duty computed in the motor driving duty computation portion 210 for the selected FET.

Figure 3:
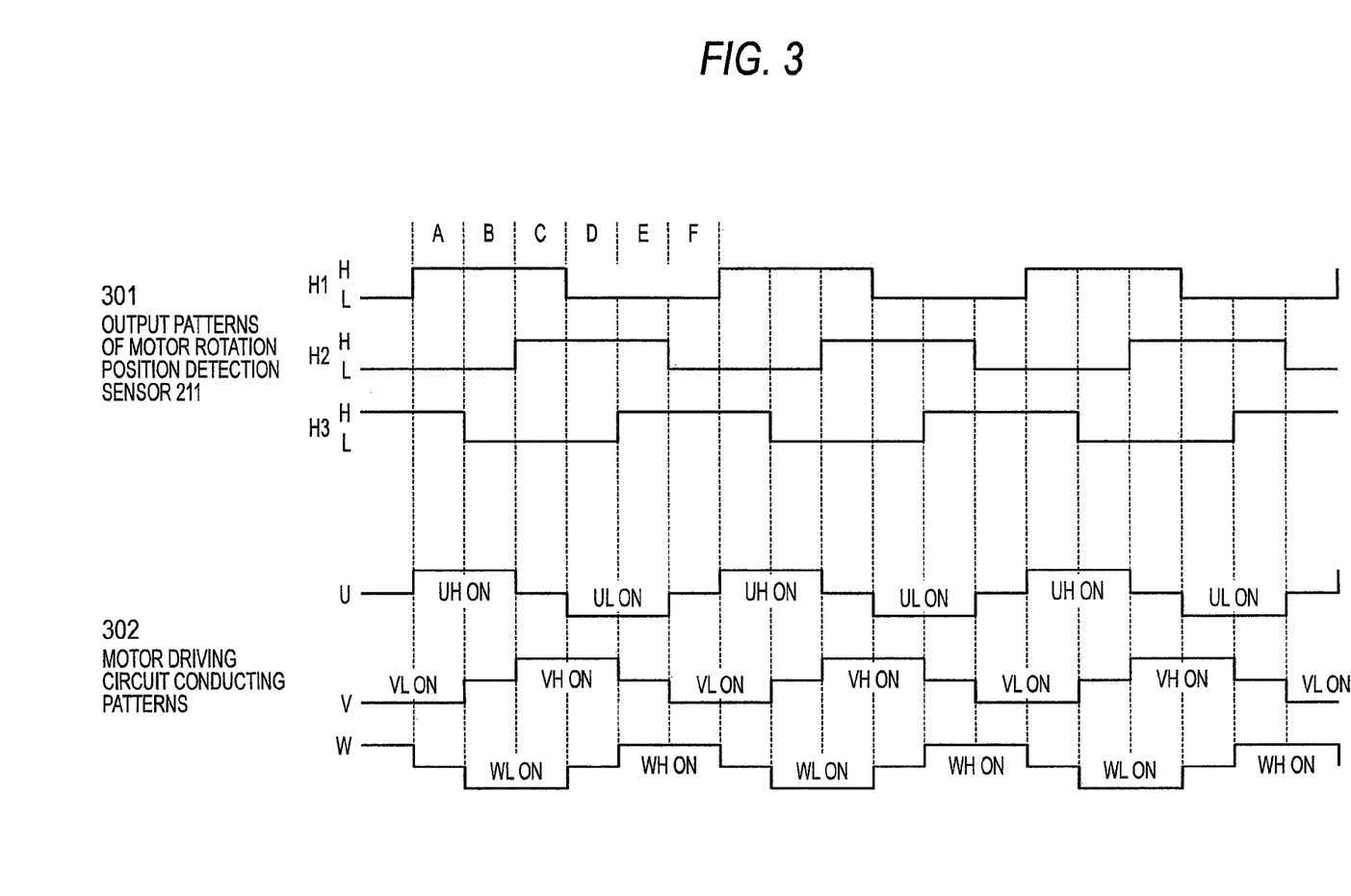
FIG. 3 is a waveform chart showing a relation of output patterns of a motor rotation position detection sensor and motor driving circuit conducting patterns according to the embodiment of the invention.

FIG. 3 is a view showing a driving pattern of the motor driving circuit 203 when the motor 202 is rotated in one direction with respect to the position information detected by the motor rotation position detection sensor 211. Herein, denoted by Numeral 301 are output patterns of the motor rotation position detection sensor 211. Output patterns 301 shown herein are those of sensors H1, H2, and H3 when energizing and driving the 3-phase brushless motor by 120 degrees. An output of each sensor is either at a high level (H) or a low level (L), and six patterns in order of A through F are outputted repetitively in response to the rotation angle of the motor 202. Denoted by Numeral 302 are conducting patterns of the motor driving circuit 203 (hereinafter, referred to as the motor driving circuit conducting patterns) for the output patterns 301 of the motor rotation position detection sensor 211, and driving states of the FET in each phase are indicated.

For example, in a case where the output pattern 301 of the motor rotation position detection sensor 211 is the pattern A, then (H1, H2, H3)=(H, L, H), and UH and VL in the motor driving circuit 203 are switched ON. In a case where the output pattern 301 of the motor rotation position detection sensor 211 is the pattern B, then (H1, H2, H3)=(H, L, L), and UH and WL in the motor driving circuit 203 are switched ON. In this manner, by switching the motor driving circuit conducting patterns 302 for the respective output patterns 301 of the motor rotation position detection sensor 211, it is possible to rotate the motor 202 in one direction.

Figure 4:
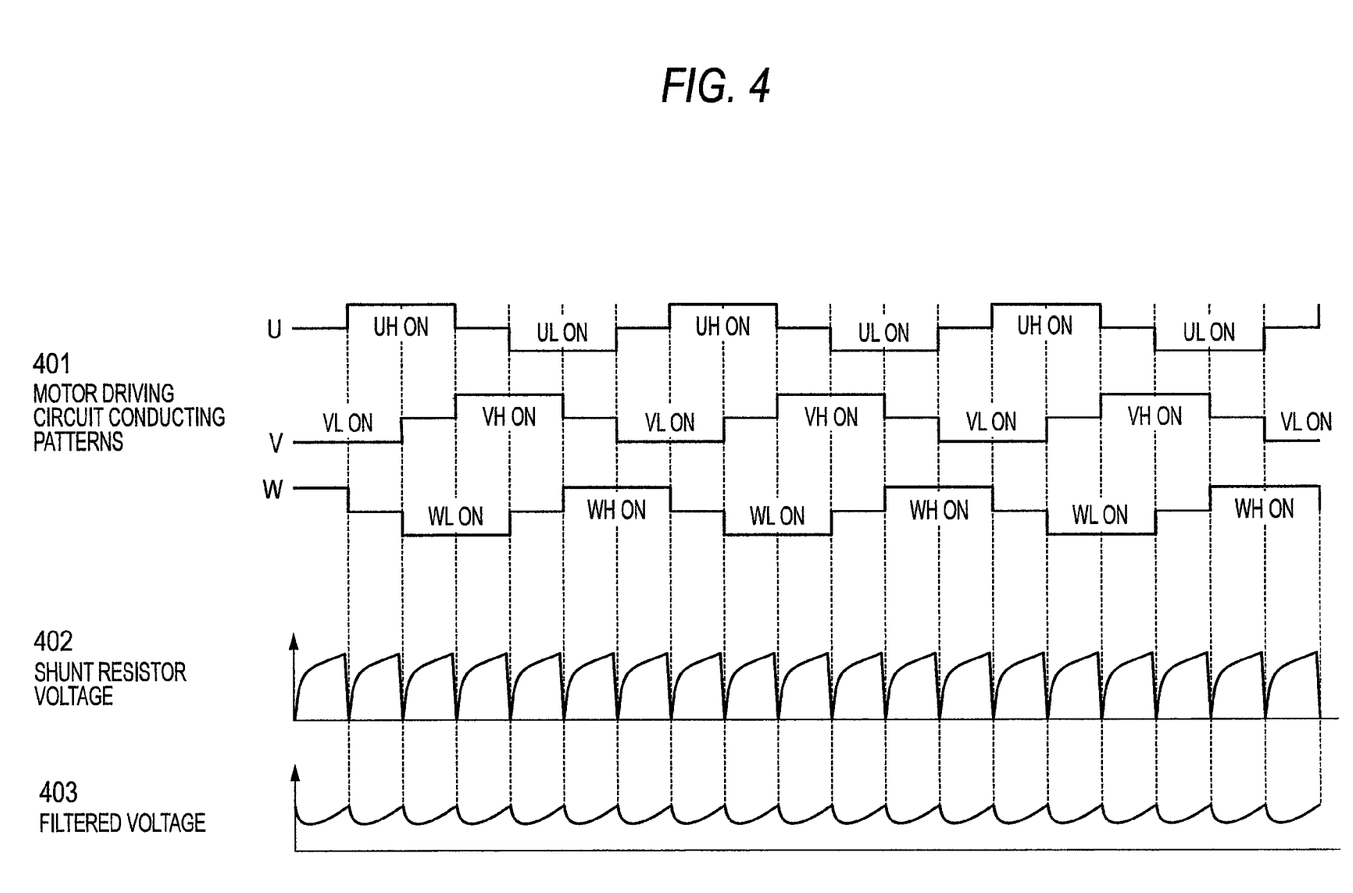
FIG. 4 is a waveform chart showing a shunt resistor voltage and an output voltage of a filter circuit in a motor driving portion according to the embodiment of the invention.

FIG. 4 is a view showing a variance in voltage in the shunt resistor 205 and the filter circuit 206 when the motor 202 is kept rotating in one direction at a constant rotation speed. Denoted by Numeral 401 are the motor driving circuit conducting patterns, which are same as the conducting patterns 302 in FIG. 3. Numeral 402 denotes a voltage across the shunt resistor 205 (hereinafter, referred to as the shunt resistor voltage). Because the flowing direction of a current changes when the motor driving circuit conducting patterns 402 are switched, the current value decreases first, and then increases gradually in accordance with the time constant of the system to saturation. Numeral 403 indicates a voltage after it has passed through the filter circuit 206 (hereinafter, referred to as the filtered voltage). It is an output voltage after the voltage across of the shunt resistor 205 passed through the filter circuit 206 with the aim of smoothing the shunt resistor voltage 402. However, because of the trade-off between the smoothness and a response, it is impossible to achieve complete smoothness and the resulting waveform is like the shunt resistor voltage waveform that is flattened incompletely. Because the shunt resistor value is known, it is possible to compute the value of a current flowing in the shunt resistor 205 by detecting the shunt resistor voltage value.

Figure 5:
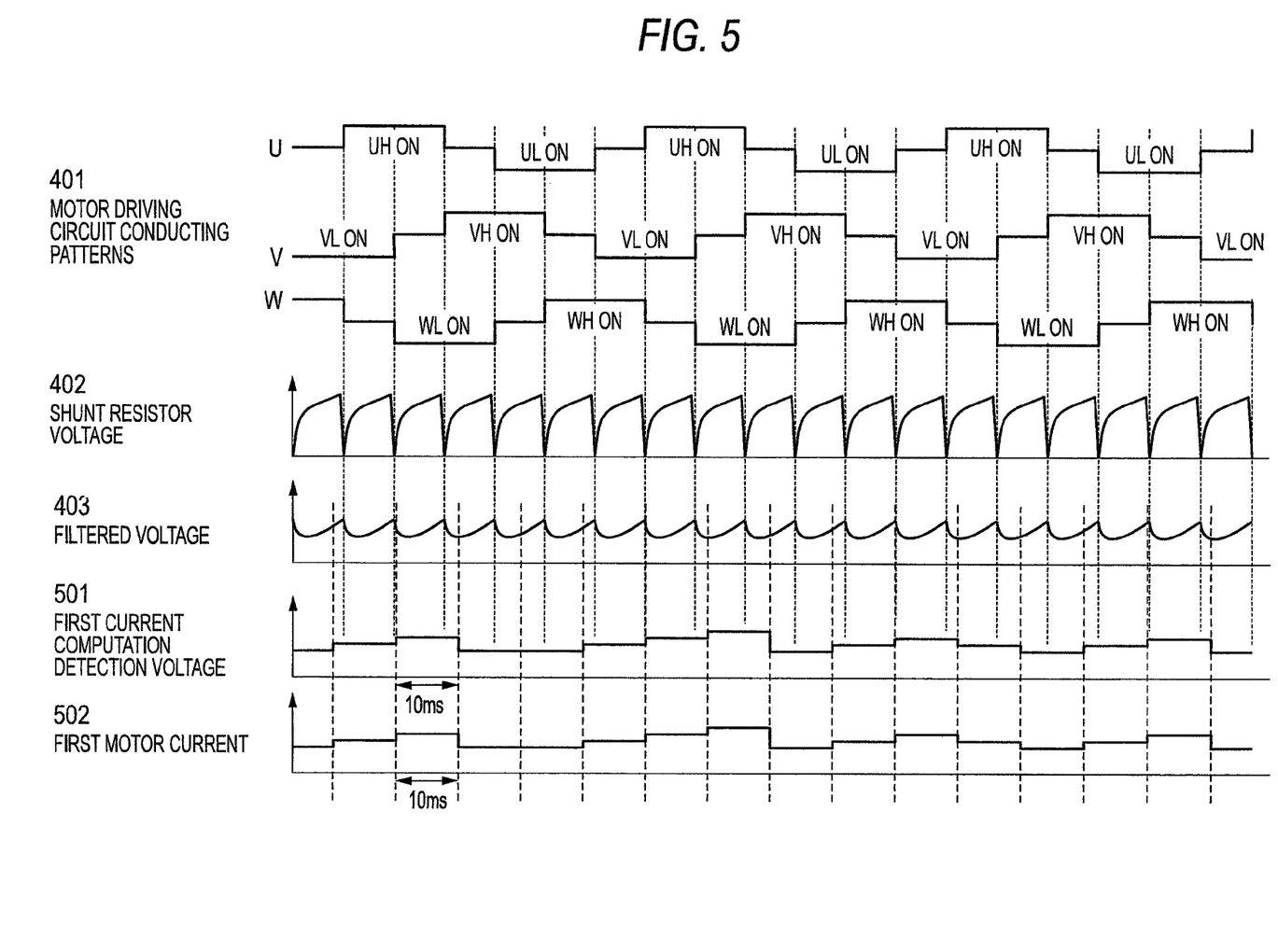
FIG. 5 is a waveform chart showing a voltage detected in a first motor current detection portion in the motor control portion according to the embodiment of the invention.

FIG. 5 is a view used to describe a current detection method employed in the first motor current detection portion 207. In the drawing, Numerals 401, 402, and 403 are the same as those in FIG. 4. Numeral 501 denotes a first current computation detection voltage included in the first motor current detection portion 207. The first motor current detection portion 207 detects the filtered voltage 403 at regular times, herein every 10 ms. Numeral 502 denotes a first motor current computed on the basis of the first current computation detection voltage 501. The first motor current 502 is computed in a timer interruption routine at specific time intervals by the microcomputer equipped to the gear-change control portion 105. The switching cycles of the conducting patterns 402 of the motor 202 depend on the motor rotation speed, and are asynchronous with the interruption executed at specific time intervals by the microcomputer. Accordingly, the filtered voltage 403 detected by the timer interruption at specific time intervals varies within a range of variance of the filtered voltage 403. The motor current to be computed thus varies within the range of variance of the filtered voltage 403. Even when the motor 202 is in a steady operation and the motor current on average is constant, because the motor current computed value varies as described above, the current feedback control is susceptible to a variance of the detected current, which consequently gives rise to a variance of a motor output toque.

Figure 9:
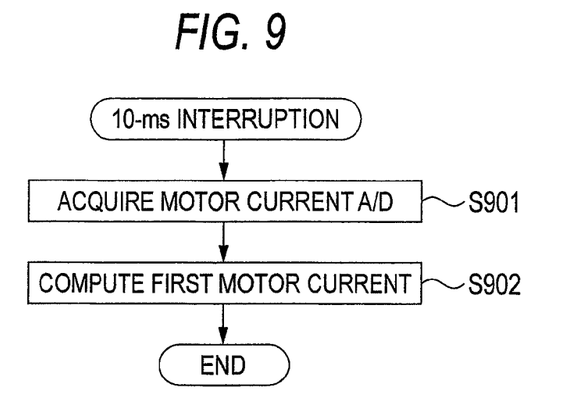
FIG. 9 is a flowchart detailing a current computation method employed in the first motor current detection portion in the motor control portion according to the embodiment of the invention.

FIG. 9 is a flowchart detailing the current computation method by the first motor current detection portion 207, and the processing is performed by 10-ms timer interruption. This processing is a processing routine executed every 10 ms.

S901 is a step in which a motor current A/D is acquired, and the filtered voltage 403 is detected by reading the A/D value of the filtered voltage 403.

S902 is a step in which the first motor current 502 is computed, and the first motor current 502 is computed on the basis of the filtered voltage 403 read in S901 and the resistance value of the shunt resistor 205.

Figure 6:
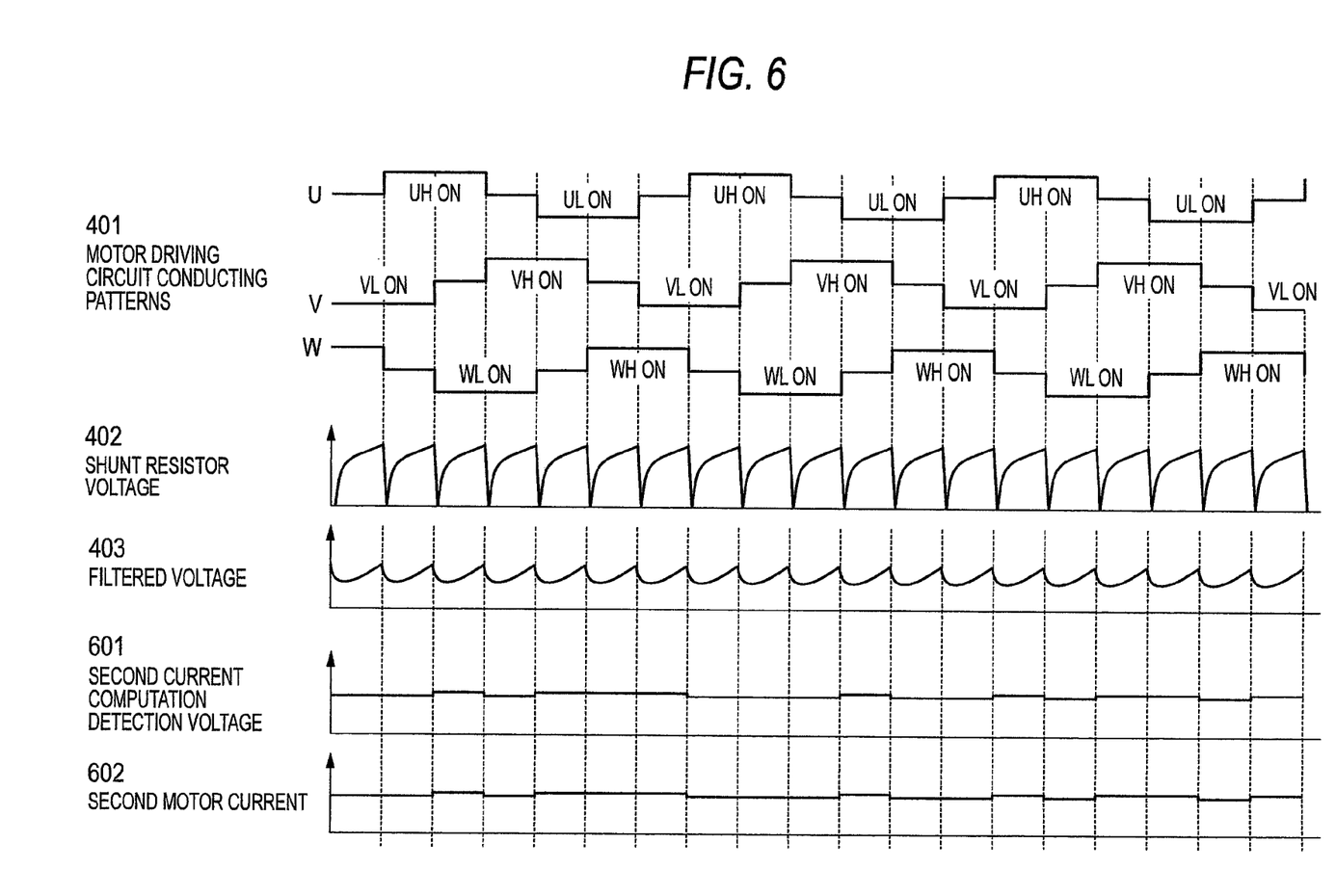
FIG. 6 is a waveform chart showing a voltage detected in a second motor current detection portion in the motor control portion according to the embodiment of the invention.

FIG. 6 is a view used to describe a current detection method employed in the second motor current detection portion 208. Referring to the drawing, numerals 401, 402, and 403 are the same as those in FIG. 4 and FIG. 5. Numeral 601 denotes a second current computation detection voltage to compute a current in the second motor current detection portion 208. On the basis of the second current computation detection voltage 601, the voltage value is detected in sync with the motor rotation position, and the filtered voltage 403 is detected upon detection of a variance in an output signal of the motor rotation position detection sensor 211. Numeral 602 denotes a second motor current computed on the basis of the second current computation detection voltage 601. The second motor current 602 is computed in a timer interruption routine at specific time intervals in the microcomputer equipped to the gear-change control portion 105. The motor driving circuit conducting patterns 401 are switched when the current value computation is completed after the output signal of the motor rotation position detection sensor 211 has varied. Accordingly, the switching of the motor driving circuit conducting patterns 401 and a variance of the filtered voltage 403 are in sync with each other. This makes it possible to compute a motor current at particular timing for a variance of the filtered voltage 403. A range of variance of the motor current to be computed can be thus decreased with respect to the variance range of the filtered voltage 403. The detected current thus varies little under the current feedback control. Consequently, it is possible to perform motor torque control with high accuracy by suppressing a variance of the motor output torque in comparison with the first motor current detection portion 207. It should be noted, however, that the second motor current detection portion 208 starts the computation when triggered by a variance of the motor rotation position detection portion 211. Hence, it fails to detect the motor current while the motor 202 is not rotating because an output of the motor rotation position detection sensor 211 does not vary. In addition, in a state where the motor rotating speed is extremely low, the motor current detection cycle becomes longer. This makes it impossible to detect a variance of the motor current during the detection cycle. As a consequence, a difference is produced between the detected current and the actual current, and the accuracy of the motor torque control is lowered. Further, in a state where the motor rotation speed is extremely high, the variation cycle of the motor rotation position detection sensor 211 becomes shorter. This increases the computation load applied on the microcomputer.

Figure 10:
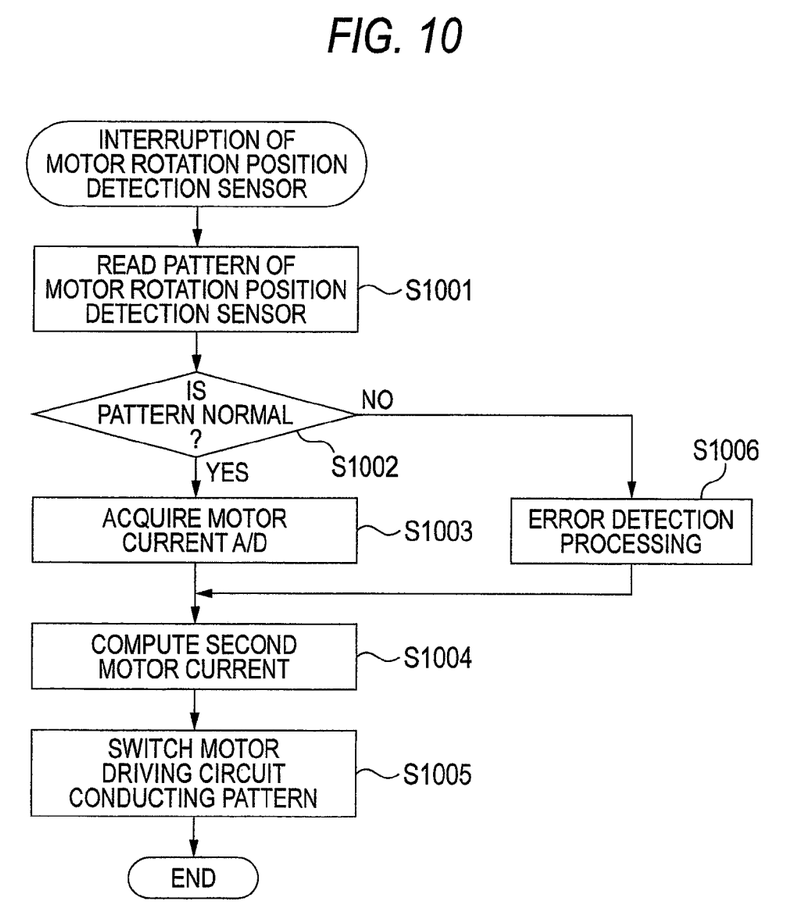
FIG. 10 is a flowchart detailing a current computation method employed in the second motor current detection portion in the motor control portion according to the embodiment of the invention.

FIG. 10 is a flowchart detailing an interruption processing method at the occurrence of a variance in an output signal of the motor rotation position detection sensor 211. The processing is performed at the occurrence of a variance in an output signal of the motor rotation position detection sensor 211.

In S1001, the pattern 301 of the motor rotation position detection sensor 211 is read.

In S1002, it is determined whether the pattern 301 of the motor rotation position detection sensor 211 read in S1001 is normal. As are shown in FIG. 3, the motor rotation position detection sensor 211 has six output patterns in total, and because there is only one pattern when the motor 202 is rotated forward or backward from a particular pattern, an abnormality can be determined when any other pattern is detected.

In a case where the pattern is determined as being normal in S1002, the flow proceeds to S1003. S1003 is a step in which the motor current A/D is acquired, and the filtered voltage 403 is detected by reading the A/D value of the filtered voltage 403.

S1004 is a step in which the second motor current 602 is computed, and the second motor current 602 is computed on the basis of the filtered voltage 403 read in S1003 and the resistance value of the shunt resistor 205.

In S1005, because the current detection of the motor 202 is completed, the motor driving circuit conducting pattern 401 is switched to the pattern corresponding to the pattern 301 of the motor rotation position detection sensor 211 read in S1001.

In a case where the pattern 301 is detected as not being normal in S1002, specific error detection processing is performed in S1006.

Figure 7:
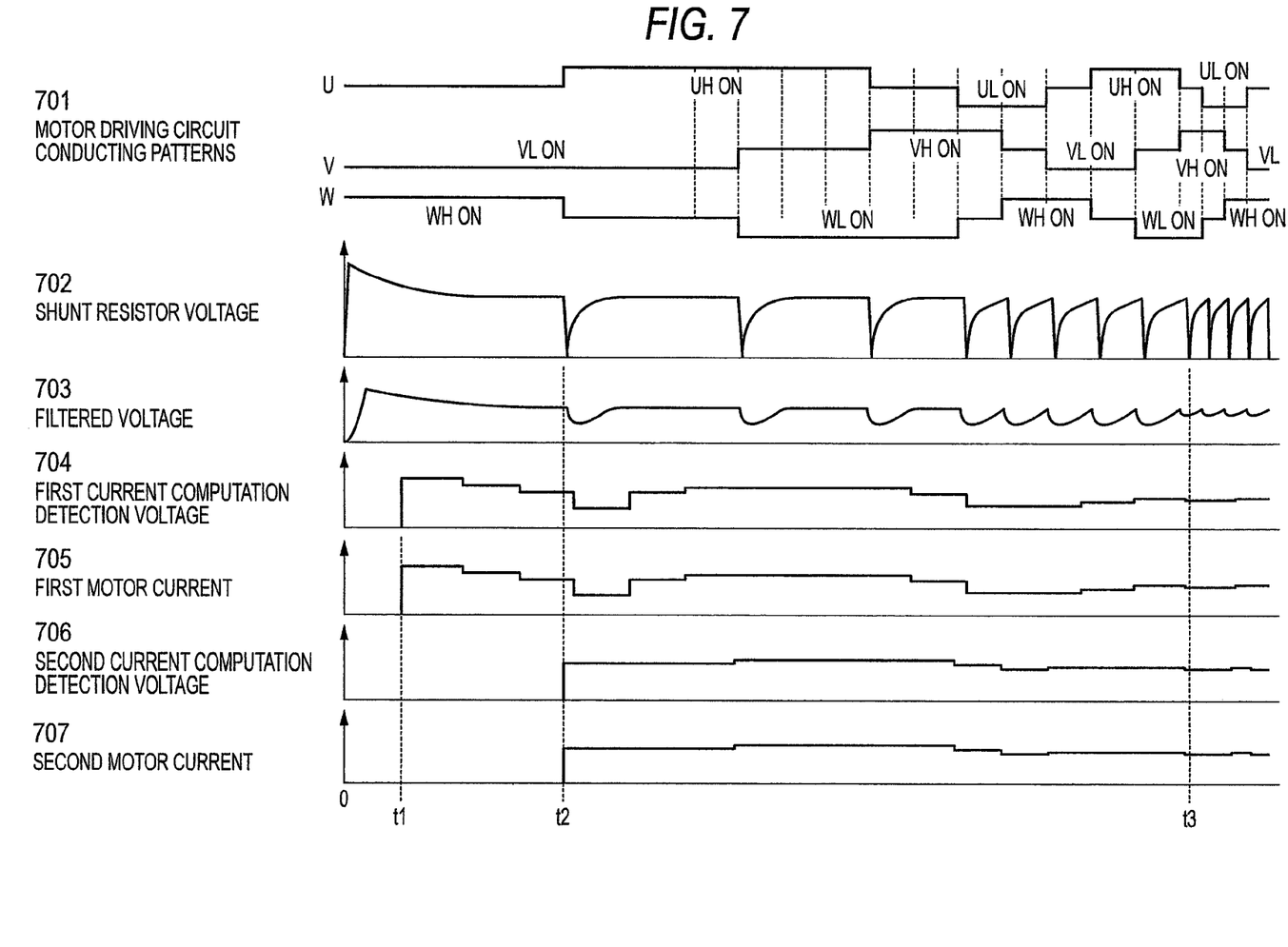
FIG. 7 is a waveform chart showing variances of voltages detected by the motor current detection portions while the motor in the motor control portion is rotating according to the embodiment of the invention.

FIG. 7 is a chart showing the motor driving circuit conducting patterns and a variance of the detected voltage to compute the current when the motor rotation speed is increased from a state where the motor 202 is stopped. Referring to the drawing, denoted by Numeral 701 are motor driving circuit conducting patterns. It is understood that the motor rotation speed is increased from a state where the motor 202 is stopped and the switching cycles of the motor driving circuit conducting patterns 701 become shorter gradually. Numeral 702 denotes the shunt resistor voltage and Numeral 703 denotes the filtered voltage. Numeral 704 denotes an output voltage of the filter circuit 206 obtained at the first current computation detection timing, that is, a variance of the first motor current computation detection voltage. The first motor current indicated by Numeral 705 is computed by the procedure detailed in the flowchart of FIG. 9. Numeral 706 denotes an output voltage of the filter circuit 206 obtained at the second current computation detection timing, that is, a variance of the second current computation detection voltage. The second motor current indicated by Numeral 707 is computed by the procedure detailed in the flowchart of FIG. 10.

Referring to FIG. 7, the time 0 is a state where the motor 202 is stopped, and in order to drive the motor 202, the conducting pattern 701 is provided to the motor driving circuit 203. By providing the conducting pattern 701, the current is allowed to flow in the motor 202, and the motor 202 generates a rotation torque in a specific rotation direction.

Time t1 is the first computation timing for the first motor current detection portion 207 since time 0. The first motor current 705 is computed by the procedure detailed in FIG. 9 according to the detected voltage of the filter circuit 206 at this timing. Thereafter, in the period from time t1 to time t2, the motor 202 starts to rotate in the specific rotation direction, and the first motor current detection portion 207 detects the filtered voltage 703 at every specific timing to compute the first motor current 705. Because this interval is the beginning of the rotation and the motor rotation speed is low, there is no variance in an unillustrated output of the motor rotation position detection sensor 211 and the motor driving circuit conducting pattern 701 is constant. Accordingly, the second motor current detection portion 208 does not detect a current.

At time t2, a variance occurs in the unillustrated output of the motor rotation position detection sensor 211 for the first time since the start of the motor driving, and the motor driving circuit conducting patterns 701 are switched. At this point in time, the second motor current 707 is computed on the basis of the output voltage 704 of the filter circuit 206 at this timing by the procedure detailed in FIG. 10. At and after time t2, too, the first motor current detection portion 207 detects the first motor current 705 at every specific timing, whereas the second motor current detection portion 208 detects the second motor current 707 at the timing at which the output of the motor rotation position detection sensor 211 varies.

The state at and after time t3 is a state where the motor rotation speed is high and the switching cycle of the motor driving circuit conducting patterns 701 is shorter. At this point in time, the filtered voltage 703 of the shunt resistor voltage 702 has a smaller variance amount of the voltage in comparison with a state before time t3 where the motor rotation speed is low. Accordingly, a variance of the output voltage of the filter circuit 206 detected by the first motor current detection portion 207 becomes smaller, too, and the variance amount becomes equal to an amount of the variance in the output voltage of the filter circuit 206 detected by the second motor current detection portion 208. In addition, because the motor rotation speed is high, the switching cycle of the outputs 301 of the motor rotation position detection sensor 211 is shorter than the interval of the specific computation timings of the first motor current detection portion 207, and the motor current computation updating cycle in the second motor current detection portion 208 is shorter than that in the first motor current detection portion 207.

As has been described, in a case where a motor current is to be detected with high accuracy, the control is performed by selecting the suitable current in a manner as follows. In a case where the motor 202 is stopped or the rotation speed is low (in FIG. 7, $0 \leq t < t2$), the first motor current 705 is selected. In a case where the motor rotation speed is moderate ($t2 \leq t < t3$), the second motor current 707 is selected. In a case where the motor rotation speed is high ($t \geq t3$), the first motor current 705 is selected.

Figure 8:
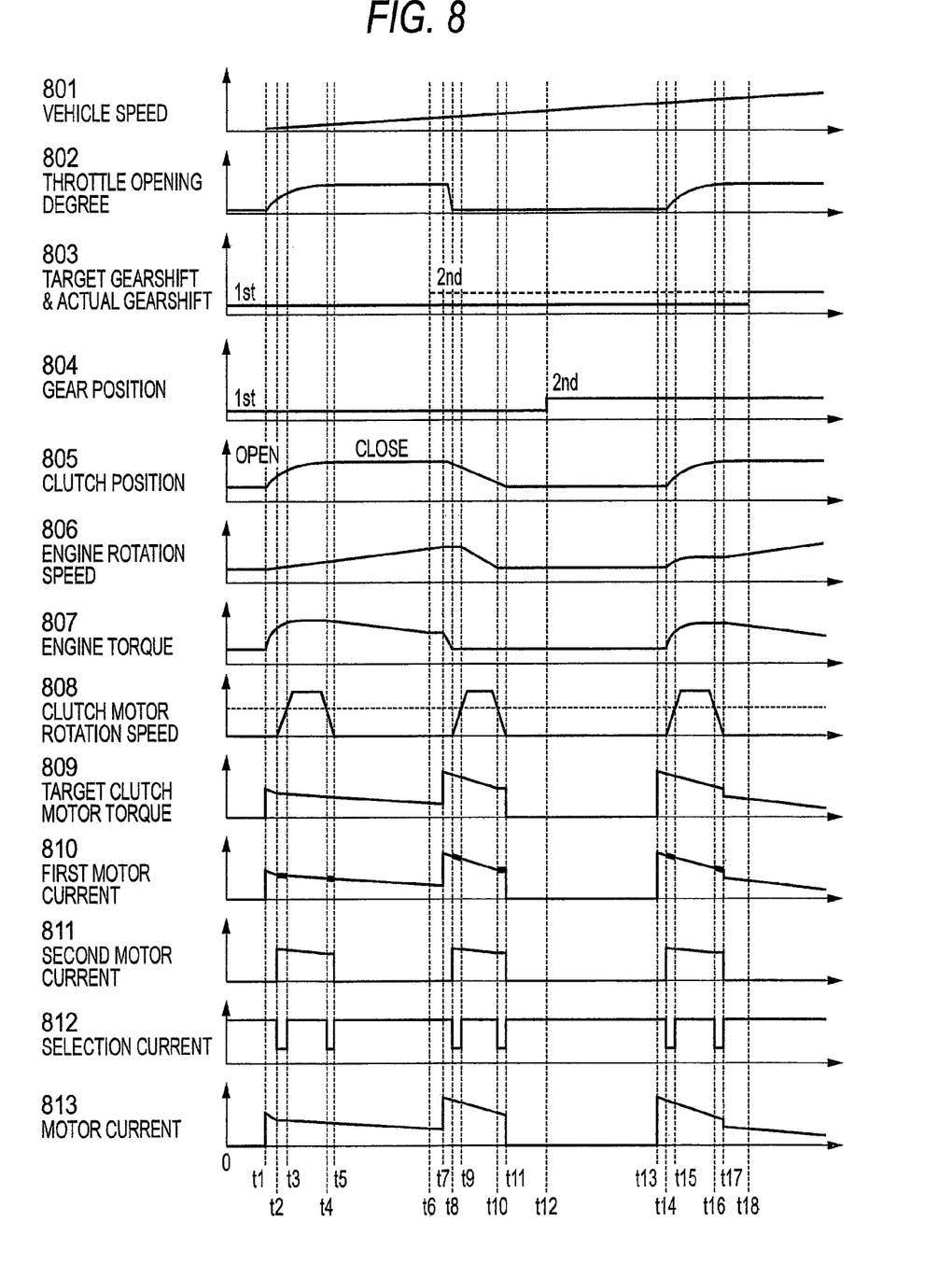
FIG. 8 is a view used to describe an operation showing a behavior of the transmission control device while a vehicle is running according to the embodiment of the invention.

FIG. 8 is a chart showing a gear-change behavior of the automatic transmission 102 while a vehicle is running. Referring to the drawing, Numeral 801 denotes a vehicle speed, and shown herein is a case where a vehicle in a stopped state is started or accelerated. Numeral 802 denotes a throttle opening degree. Denoted by Numeral 803 are a target gearshift (dotted line) and an actual gearshift (solid line), and the gearshift changes from the first gear to the second gear with acceleration. Numeral 804 denotes the gear position in the gear-change mechanism 104. Numeral 805 denotes the clutch position. The clutch 103 is open at the position indicated as "OPEN" in the drawing, which is a state where no motive power is transmitted from the engine 101 to the transmission 102. The clutch 103 is engaged at the position indicated as "CLOSE", which is a state where motive power is transmitted from the engine 101 to the transmission 102. Numeral 806 denotes a variance of the rotation speed of the engine 101, and Numeral 807 denotes a variance of the engine torque. Numeral 808 denotes a rotation speed of the clutch motor 202 included in the clutch control portion 107 that controls the clutch 103. Numeral 809 denotes a target clutch motor torque, which is a target torque of the clutch motor 202. Numeral 810 denotes the first motor current detected in the first motor current detection portion 207. The intervals in which the lines are thickened in the drawing, such as the intervals from time t2 to time t3 and from time t4 to time t5, are the intervals in which the detected current varies considerably. Numeral 811 denotes a second motor current detected in the second motor current detection portion 208. Numeral 812 denotes a selection current specifying which one of the first motor current 810 and the second motor current 811 is to be selected for the control. In a case where the selection current 812 is at the high level, the first motor current 810 is used for the control, whereas in the case where the selection current 812 is at the low level, the second motor current 811 is used for the control. Numeral 813 denotes a motor current used to control the motor current in achieving the target clutch torque, which is either the first motor current 810 or the second motor current 811 selected on the basis of the selection current 812.

An operation of FIG. 8 will now be described.

The period from time t0 to time t1 is a state where a vehicle is stopped at the vehicle speed of 0 km/h. At this point in time, the throttle opening degree is an idle opening degree at which the idle rotation speed is maintained. The target gearshift, the actual gearshift, and the gear position are at the first gear.

The period from the time t1 to time t5 shows the behavior when a vehicle is started from a stopped state. At time t1, the unillustrated accelerator is depressed. This is an interval to increase the engine torque by increasing the throttle opening degree while maintaining the clutch 103.

At time t1, the driving on the throttle opening side is started, and the target clutch motor torque is increased so as to change the clutch position.

In the period from time t1 to time t2, the clutch motor 202 has not started rotating. The selection current 812 is therefore at the high level, and the first current 810 is used for the control as the motor current 813.

The period from time t2 to time t3 is an interval, in which the clutch motor 202 starts to rotate and the clutch motor rotation speed is lower than the specific rotation speed. The selection current 812 is at the low level in this interval, and the second motor current 811, which varies less than the first motor current 810, is used for the control as the motor current 813.

The period from time t3 to time t4 is an interval, in which the motor rotation speed is higher than or equal to the specific rotation speed in order to vary a stroke of the clutch 103 rapidly. The selection current 812 is at the high level in this interval, and the first motor current 810, which has smaller processing load on the microcomputer than the second motor current 811, is used for the control. Because the motor rotation speed is high and the motor current varies little in this interval, using the first motor current 810 for the control gives little influence.

The period from time t4 to time t5 is an interval, in which the travel speed of the clutch 103 is reduced to engage the clutch 103 and the clutch motor rotation speed is less than the specific rotation speed. The selection current 812 is at the low level in this interval, and the second motor current 811, which varies less than the first motor current 810, is used for the control.

The state in the period from time t5 to time t6 is a state where the vehicle is accelerating at the first gear. At this point in time, because the clutch 103 is engaged, the clutch motor 202 is not rotating and the first current 810 is used.

At time t6, the target gearshift changes to the second gear because the vehicle speed has increased, and the period from time t6 to time t18 shows a behavior when the gearshift changes from the first gear to the second gear. Of these times, the period from time t6 to time t11 shows an operation when the clutch 103 is disengaged and this operation will be described.

The period from time t6 to t7 is a gear-change preparation period, and there is no variance in the information shown in the drawing. The clutch motor 202 is not rotating and the first motor current 810 is used for the control.

In the period from time t7 to time t8, in order to disengage the clutch 103, the throttle is closed first to reduce the engine torque, and at the same time, the target clutch motor torque is increased to change the clutch position. At this point in time, too, the clutch motor 202 is not rotating and the first motor current 810 is used for the control.

The period from time t8 to time t9 is an interval, in which the clutch motor 202 starts to rotate and the clutch motor rotation speed is lower than the specific rotation speed. The selection current 812 is at the low level in this interval, and the second motor current 811, which varies less than the first motor current 810, is used for the control.

The period from time t9 to time t10 is an interval in which the motor rotation speed is higher than or equal to the specific rotation speed in order to change a stroke of the clutch 103 rapidly. The selection current 812 is at the high level in this interval and the first motor current 810, which has smaller processing load on the microcomputer than the second motor current 811, is used for the control. Because the motor rotation speed is high and the motor current varies little in this interval, using the first motor current 810 for the control gives little influence.

The period from time t10 to time t11 is an interval, in which the travel speed of the clutch 103 is reduced because the clutch 103 has come close to the fully open position and the clutch motor rotation speed is lower than the specific rotation speed. The selection current 812 is at the low level in this interval, and the second motor current 811, which varies less than the first motor current 810, is used for the control as the motor current 813.

The period from time t11 to time t13 is a state where the clutch 103 is fully open. Because the motor 202 is not driving, no motor current flows. At time t12, because the clutch 103 is disengaged, the gear position in the transmission 102 is changed from the first gear to the second gear.

The period from time t13 to time t18 shows an operation when the clutch 103 is engaged and this operation will be described.

In the period from time t13 to time t14, the target clutch motor torque is increased in order to engage the clutch 103. At this point in time, the clutch motor 202 is not rotating and the first motor current 810 is used for the control.

The period from time t14 to time t15 is an interval, in which the clutch motor 202 starts to rotate and the clutch motor rotation speed is lower than the specific rotation speed. The selection current 812 is at the low level in this interval and the second motor current 811, which varies less than the first motor current 810, is used for the control.

The period from time t15 to time t16 is an interval, in which the motor rotation speed is higher than or equal to the specific rotation speed in order to change a stroke of the clutch 103 rapidly. The selection current 812 is at the high level in this interval, and the first motor current 810, which has smaller processing load on the microcomputer than the second motor current 811, is used for the control. Because the motor rotation speed is high and the motor current varies little in this interval, using the first motor current 810 for the control gives little influence.

The period from time t16 to t17 is an interval, in which the travel speed of the clutch 103 is reduced in order to engage the clutch 103 and the clutch motor rotation speed is lower than the specific rotation speed. The selection current 812 is at the low level in this interval, and the second motor current 811, which varies less than the first motor current 810, is used for the control.

The period from time t17 to time t18 is a pre-assigned time after the clutch is engaged, and the actual gearshift is changed to the second gear by determining that the gear change is completed at time t18.

Because the motor 202 stops rotating while the clutch 103 is engaged after time t18, the first current 810 is used for the control.

Figure 11:
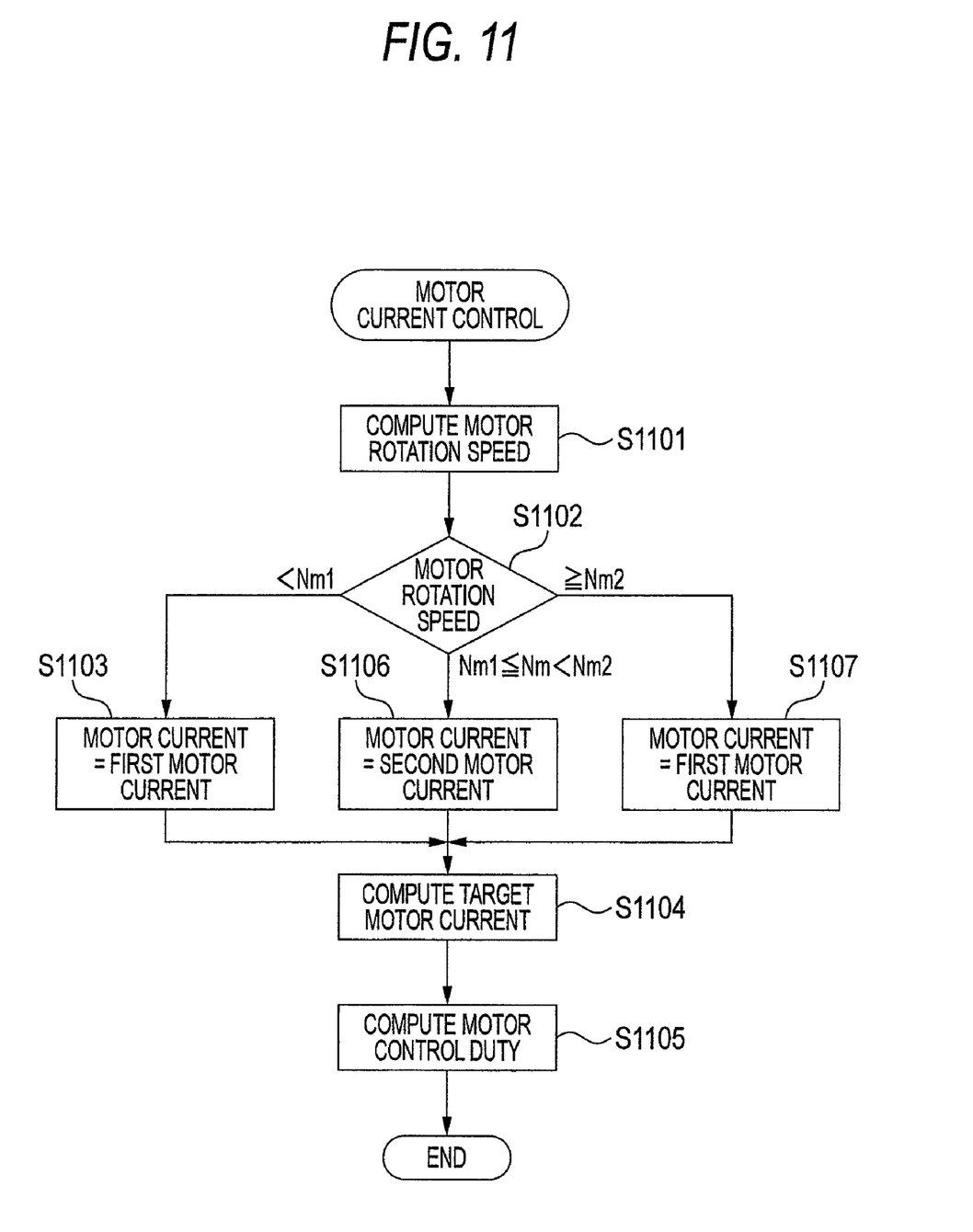
FIG. 11 is a flowchart detailing a motor current computation method by the motor control portion according to the embodiment of the invention.

FIG. 11 is a flowchart detailing the motor current control procedure. Referring to the drawing, the motor rotation speed is computed in Step 1101. In Step 1102, a comparison is made with respect to the motor rotation speed computed in Step 1101. When the motor rotation speed (Nm) is lower than the specific value (Nm1), the flow proceeds to Step 1103, in which the first motor current 810 is selected as the motor current 813. In a case where the motor rotation speed (Nm) is found to be in a range of a specific value (Nm1≦Nm<Nm2) in Step 1102, the flow proceeds to Step 1106, in which the second motor current 811 is selected as the motor current 813. In a case where the motor rotation speed (Nm) is found to be greater than or equal to the specific value (Nm≧Nm2) in Step 1102, the flow proceeds to Step 1107, in which the first motor current 810 is selected as the motor current 813. In Step 1104, the target motor current, which is used to achieve a suitable motor torque according to the driving state, is computed. Step 1105 is a step in which a motor control duty is computed. The motor control duty is computed through the feedback computation by comparing the target motor current computed in Step 1104 with the motor current 813 determined in any of Steps 1103, 1106, and 1107. Herein, because the current feedback control is performed using a current value with high accuracy selected in response to the motor rotation speed, it is always possible to control the motor 202 with high accuracy regardless of the operation state of the motor 202.

As has been described, according to the embodiment, the clutch motor is controlled using the motor current, and the most suitable detected motor current is used for each gear-change interval. It is thus possible to perform the clutch control that best suits the state of gear change. In addition, because the clutch engaging force can be controlled with high accuracy according to the operation state of the engine even when a vehicle is running, not only can the comfortable feeling during the driving be enhanced, but also a contribution can be made to enhancement of the fuel efficiency because the load needed for the clutch engagement can be minimized.

The embodiment above described a case where the output control is performed for the motor that executes the control operation on the clutch control portion. It should be appreciated, however, that the invention is also applicable when the gear-change mechanism control portion that controls the gear-change mechanism portion is controlled using a motor.

Various modifications and alterations of the present invention will be apparent to those skilled in the art without departing from the scope and sprit of the present invention, and it should be understood that the present invention is not limited to the illustrative embodiment set forth herein.

What is claimed is:

1. A control device of an automatic transmission, comprising:
   an automatic transmission coupled to an engine and having a gear-change mechanism portion and a clutch to transmit motive power from the engine to the gear-change mechanism portion;
   a clutch control portion to engage and disengage the clutch; and
   a motor control portion to control an output of a motor that executes a control operation on the clutch control portion by a processor
   wherein the motor control portion includes:
   a target motor current computation portion that computes a target motor current according to a desired driving state;
   a motor current detection portion that detects plural motor currents respectively corresponding to plural detection timings;
   a selection portion that selects a motor current corresponding to the desired driving state among the plural motor currents that have been detected; and
   a motor driving portion that applies feedback control on the output of the motor according to a difference between the target motor current and the motor current that has been selected.

2. The control device of an automatic transmission according to claim 1, wherein:
   the motor control portion switches the detection motor currents to be used for the feedback control according to a motor rotation speed.

3. The control device of an automatic transmission according to claim 2, wherein the motor control portion includes:
   a first motor current detection portion that detects a motor current at specific time intervals; and
   a second motor current detection portion that detects a motor current in sync with a motor rotation angle position, and
   wherein the motor current detected in the first motor current detection portion is used for the feedback control in a period for the motor in a stopped state to reach a first motor rotation speed, and the motor current detected in the second motor current detection portion is used for the feedback control while the motor rotation speed is higher than or equal to a specific motor rotation speed.

4. The control device of an automatic transmission according to claim 3, wherein:
   when the motor rotation speed is higher than or equal to a second motor rotation speed, which is higher than the first motor rotation speed, the motor control portion uses the current detected in the first motor current detection portion for the feedback control.

5. A control method of an automatic transmission composed of an automatic transmission coupled to an engine and having a gear-change mechanism portion and a clutch to transmit motive power from the engine to the gear-change mechanism portion, a clutch control portion to engage and disengage the clutch, and a motor control portion to control an output of a motor that executes a control operation on the clutch control portion, as operations by the motor control portion by a processor
   computing a target motor current for a desired driving state;
   detecting plural motor currents respectively corresponding to plural detection timings;
   selecting a motor current corresponding to the desired driving state among the plural motor currents that have been detected; and
   applying feedback control on the output of the motor according to a difference between the target motor current and the motor current that has been selected.

* * * * *